United States Patent
Tseng et al.

(10) Patent No.: US 12,317,146 B2
(45) Date of Patent: May 27, 2025

(54) MOBILITY BETWEEN CONFIGURED CELLS

(71) Applicant: MEDIATEK INC., Hsin-Chu (TW)

(72) Inventors: Li-Chuan Tseng, Hsin-Chu (TW); Chia-Hao Yu, Hsin-Chu (TW); Kuan-Hung Chou, Hsin-Chu (TW); Chia-Chun Hsu, Hsin-Chu (TW); Yih-Shen Chen, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 372 days.

(21) Appl. No.: 17/945,053

(22) Filed: Sep. 14, 2022

(65) Prior Publication Data
US 2023/0095823 A1    Mar. 30, 2023

Related U.S. Application Data

(60) Provisional application No. 63/249,091, filed on Sep. 28, 2021.

(51) Int. Cl.
*H04W 36/00* (2009.01)
*H04W 36/08* (2009.01)
*H04W 56/00* (2009.01)

(52) U.S. Cl.
CPC ... *H04W 36/0094* (2013.01); *H04W 36/0077* (2013.01); *H04W 36/085* (2023.05); *H04W 56/001* (2013.01)

(58) Field of Classification Search
CPC ........... H04W 36/0094; H04W 36/085; H04W 36/0077; H04W 56/001; H04W 36/0061; H04W 36/0058; H04W 36/302; H04W 36/02

See application file for complete search history.

(56) References Cited

U.S. PATENT DOCUMENTS

| | | | |
|---|---|---|---|
| 2011/0014917 A1* | 1/2011 | Wager | H04W 36/302 455/435.2 |
| 2012/0155429 A1* | 6/2012 | Lin | H04W 36/0005 370/331 |
| 2014/0086213 A1 | 3/2014 | Kwon | H04W 36/00 |
| 2015/0181543 A1 | 6/2015 | Hwang | H04W 56/00 |

(Continued)

OTHER PUBLICATIONS

Taiwan Intellectual Property Office Action, dated Sep. 12, 2023 (11 pages).

*Primary Examiner* — Rushil P. Sampat
(74) *Attorney, Agent, or Firm* — Helen Mao; Zheng Jin; Imperium Patent Works

(57) ABSTRACT

A method of configuring a set of active cells among neighboring cells to reduce latency and interruption for inter-cell mobility is proposed. The set of active cells is an active set of cells among which UE can do fast cell switching. The set of active cells is configured by the network based on UE measurement report or network deployment information. UE maintains the configuration and can perform pre-synchronization to the configured active cells in downlink (DL) only or in both DL and uplink (UL). UE maintains the DL/UL synchronization with the active cells, and applies configuration once UE is indicated to switch to an active cell as the target cell. Because UE maintains the configuration and DL/UL timing of the target cell before receiving the cell-switch command, the mobility latency and interruption time for inter-cell mobility is reduced.

16 Claims, 6 Drawing Sheets

(56) References Cited

U.S. PATENT DOCUMENTS

2016/0192270 A1\* 6/2016 Xu ..................... H04W 24/08
                                                    370/331
2016/0234723 A1\* 8/2016 Sapiano ............ H04W 36/0058
2021/0385702 A1\* 12/2021 Damnjanovic ....... H04L 5/0098

\* cited by examiner

Example: Pre-RACH with additional MAC/PHY

MOBILITY BETWEEN CONFIGURED CELLS

CROSS REFERENCE TO RELATED APPLICATIONS

This application claims priority under 35 U.S.C. § 119 from U.S. Provisional Application No. 63/249,091, entitled "Mobility between configured cells", filed on Sep. 28, 2021, the subject matter of which is incorporated herein by reference.

TECHNICAL FIELD

The disclosed embodiments relate generally to wireless communication, and, more particularly, to a method for mobility enhancement in 5G New Radio (NR) cellular communication networks.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The 3$^{rd}$ generation partner project (3GPP) network normally includes a hybrid of 2G/3G/4G systems. The next generation mobile network (NGMN) board has decided to focus the future NGMN activities on defining the end-to-end requirements for 5G new radio (NR) systems. In 5G NR, the base stations are also referred to as gNodeBs or gNBs.

Frequency bands for 5G NR are being separated into two different frequency ranges. Frequency Range 1 (FR1) includes sub-6 GHz frequency bands, some of which are bands traditionally used by previous standards, but has been extended to cover potential new spectrum offerings from 410 MHz to 7125 MHz. Frequency Range 2 (FR2) includes frequency bands from 24.25 GHz to 52.6 GHz. Bands in FR2 in this millimeter wave range have shorter range but higher available bandwidth than bands in FR1. For UEs in RRC Idle mode mobility, cell selection is the procedure through which a UE picks up a specific cell for initial registration after power on, and cell reselection is the mechanism to change cell after UE is camped on a cell and stays in idle mode. For UEs in RRC Connected mode mobility, handover is the procedure through which a UE hands over an ongoing session from the source gNB to a neighboring target gNB.

Under narrower beams, more beams, and denser deployment in 5G NR, no always-on cell reference signal is available, and High Data Rate Low Latency (HDRL) applications face new challenges. UEs may experience channel fluctuation, coverage holes, shorter beam/cell dwelling time, long measurement period, etc. More frequent cell switching results in longer overall interruption due to handover, e.g., ~75 ms for each cell change, and poor robustness with higher mobility failure, e.g., <1% in FR1 and >10% in FR2, brings even longer interruption. A solution is sought to reduce such adverse mobility performance impacts.

SUMMARY

A method of configuring a set of active cells among neighboring cells to reduce latency and interruption for inter-cell mobility is proposed. The set of active cells is an active set of cells among which UE can do fast cell switching. The set of active cells is configured by the network based on UE measurement report or network deployment information. UE maintains the configuration and can perform pre-synchronization to the configured active cells in downlink (DL) only or in both DL and uplink (UL). UE maintains the DL/UL synchronization with the active cells, and applies configuration once UE is indicated to switch to an active cell as the target cell. Because UE maintains the configuration and DL/UL timing of the target cell before receiving the cell-switch command, the mobility latency and interruption time for inter-cell mobility is reduced.

In one embodiment, a UE receives a configuration in a serving cell of a mobile communication network, wherein the configuration comprises information of an active set of cells. The UE performs pre-synchronization and measurement with each active cell in the active set base on the configuration, wherein the UE maintains downlink (DL) synchronization to each active cell. The UE receives a cell-switching command from the network to handover from the serving cell to a target cell belonging to the active set. The UE applies target configuration upon receiving the cell switching command.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
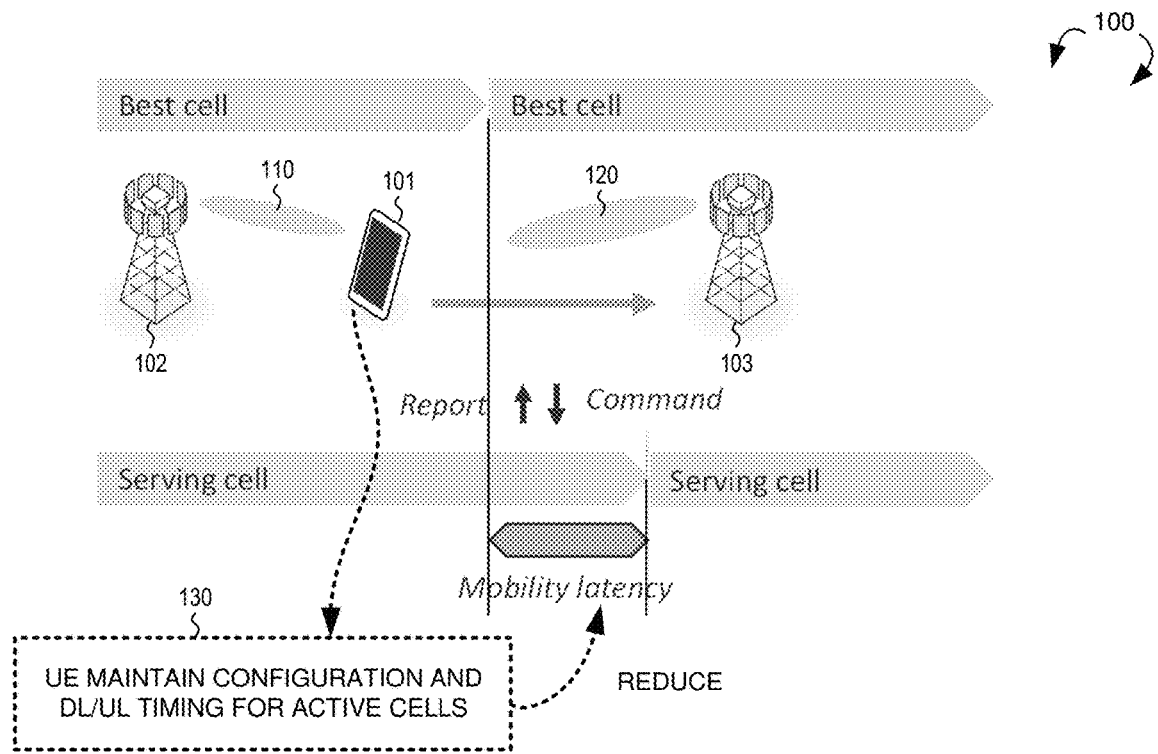
FIG. 1 illustrates an exemplary 5G New Radio (NR) network supporting active cell set configuration to reduce latency and interruption for inter-cell mobility in accordance with aspects of the current invention.

FIG. 1 illustrates an exemplary 5G New Radio (NR) network 100 supporting active cell set configuration to reduce latency and interruption for inter-cell mobility in accordance with aspects of the current invention. The 5G NR network 100 comprises a User Equipment (UE) 101 and a plurality of base stations including gNB 102 and gNB 103. UE 101 is communicatively connected to a serving gNB 102, which provides radio access using a Radio Access Technology (RAT) (e.g., the 5G NR technology). The UE 101 may be a smart phone, a wearable device, an Internet of Things (IoT) device, and a tablet, etc. Alternatively, UE 101 may be a Notebook (NB) or Personal Computer (PC) inserted or installed with a data card which includes a modem and RF transceiver(s) to provide the functionality of wireless communication.

The 5G core function receives all connection and session related information and is responsible for connection and mobility management tasks. For UEs in radio resource control (RRC) Idle mode mobility, cell selection is the procedure through which a UE picks up a specific cell for initial registration after power on, and cell reselection is the mechanism to change cell after UE is camped on a cell and stays in idle mode. For UEs in RRC Connected mode mobility, handover is the procedure through which a UE hands over an ongoing session from the source gNB to a neighboring target gNB. Under narrower beams, more beams, and denser deployment in 5G NR, no always-on cell reference signal is available, and High. Data Rate Low Latency (HDRLL) applications face new challenges. UEs may experience channel fluctuation, coverage holes, shorter beam/cell dwelling time, long measurement period, etc. More frequent cell switching results in longer overall interruption due to handover, e.g., ~75 ms for each cell change, and poor robustness with higher mobility failure, e.g., <1% in FR1 and >10% in FR2, brings even longer interruption.

In the example of FIG. 1, at an earlier time, gNB 102 may be considered as the best cell, which provides communication coverage for a geographic coverage area in which communications with UE 101 is supported via a communication link/beam 110. Later on, gNB 103 may become the best cell, which provide communication coverage for a geographic coverage area in which communications with UE 101 is supported via a communication link/beam 120. Note that UE 101 is not always served by the best cell/beam due to mobility latency, which is due to the time spent on measurement report, handover command, and handover execution. Data may be interrupted during handover for UE reconfiguration and synchronization. In case of short cell/beam dwelling time (e.g., in FR2), the percentage of time when UE is served by an inferior cell/beam, or with service interruption, can be significant. Ideally, mobility latency should be similar for intra-TRP beam switch, intra-cell inter-TRP beam switch, and inter-cell switch.

In accordance with one novel aspect, a method of configuring a set of active cells among neighboring cells to reduce latency and interruption for inter-cell mobility is proposed. The set of active cells is an active set of cells among which UE can do fast cell switching. Each cell in the active set is a candidate target cell for handover. The set of active cells is configured by the network based on UE measurement report or network deployment information. UE maintains the configuration and can perform pre-synchronization to the configured active cells in downlink (DL) only or in both DL and uplink (UL). UE maintains the DL/UL synchronization with the active cells, and applies configuration once UE is indicated to switch to an active cell as the target cell. Because UE maintains the configuration and DL/UL timing of the target cell before receiving the cell-switch command (as depicted by 130), the mobility latency and interruption time for inter-cell mobility is reduced.

Figure 2:
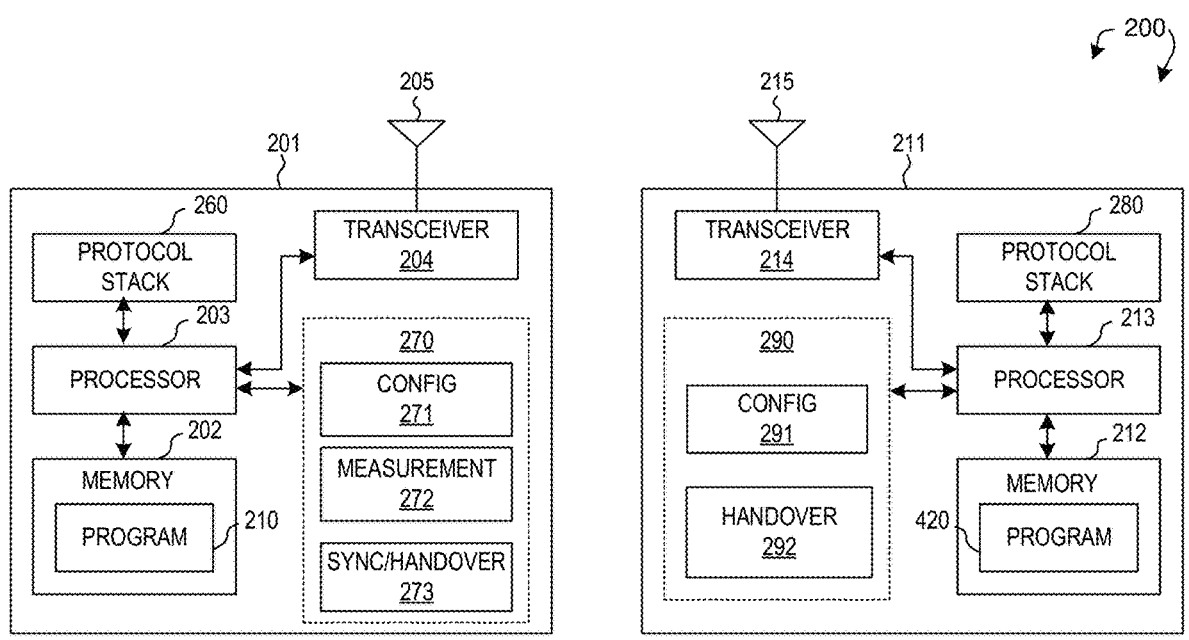
FIG. 2 illustrates simplified block diagrams of wireless devices, e.g., a UE and a gNB in accordance with embodiments of the current invention.

FIG. 2 illustrates simplified block diagrams of wireless devices, e.g., a UE 201 and a gNB 211 in accordance with embodiments of the current invention in 5G NR network 200. The gNB 211 has an antenna 215, which transmits and receives radio signals. An RF transceiver module 214, coupled with the antenna 215, receives RF signals from the antenna 215, converts them to baseband signals and sends them to the processor 213. The RF transceiver 214 also converts received baseband signals from the processor 213, converts them to RF signals, and sends out to the antenna 215. The processor 213 processes the received baseband signals and invokes different functional modules to perform features in the gNB 211. The memory 212 stores program instructions and data 220 to control the operations of the gNB 211. In the example of FIG. 2, the gNB 211 also includes a protocol stack 280 and a set of control function modules and circuits 290. The protocol stack 280 may include a Non-Access-Stratum (NAS) layer to communicate with an AMF/SMF/MME entity connecting to the core network, a Radio Resource Control (RRC) layer for high layer configuration and control, a Packet Data Convergence Protocol/Radio Link Control (PDCP/RLC) layer, a Media Access Control (MAC) layer, and a Physical (PHY) layer. In one example, the control function modules and circuits 290 include a configuration circuit for configuring measurement report and active set for UE, and a handover handling circuit for sending cell-switch to the UE upon handover decision.

Similarly, the UE 201 has a memory 202, a processor 203, and an RF transceiver module 204. The RF transceiver 204 is coupled with the antenna 405, receives RF signals from the antenna 205, converts them to baseband signals, and sends them to the processor 203. The RF transceiver 204 also converts received baseband signals from the processor 203, converts them to RF signals, and sends out to the antenna 205. The processor 203 processes the received baseband signals (e.g., comprising an SCell/PSCell addition/activation command) and invokes different functional modules and circuits to perform features in the UE 201. The memory 202 stores data and program instructions 210 to be executed by the processor 203 to control the operations of the UE 201. Suitable processors include, by way of example, a special purpose processor, a Digital Signal Processor (DSP), a plurality of micro-processors, one or more microprocessor associated with a DSP core, a controller, a microcontroller, Application Specific Integrated Circuits (ASICs), File Programmable Gate Array (FPGA) circuits, and other type of Integrated Circuits (ICs), and/or state machines. A processor in associated with software may be used to implement and configure features of the UE 201.

The UE 201 also includes a protocol stack 260 and a set of control function modules and circuits 270. The protocol stack 260 may include a NAS layer to communicate with an AMF/SMF/MME entity connecting to the core network, an RRC layer for high layer configuration and control, a PDCP/RLC layer, a MAC layer, and a PHY layer. The Control function modules and circuits 270 may be implemented and configured by software, firmware, hardware, and/or combination thereof. The control function modules and circuits 270, when executed by the processor 203 via program instructions contained in the memory 202, interwork with each other to allow the UE 201 to perform embodiments and functional tasks and features in the network. In one example, the control function modules and circuits 270 include a configuration circuit 271 for obtaining measurement and configuration information of active set, a measurement circuit 272 for performing and reporting measurements, and a sync/handover handling circuit 273 for performing (pre)-synchronization and handover procedure based on the configuration and cell-switch command received from the network.

Figure 3:
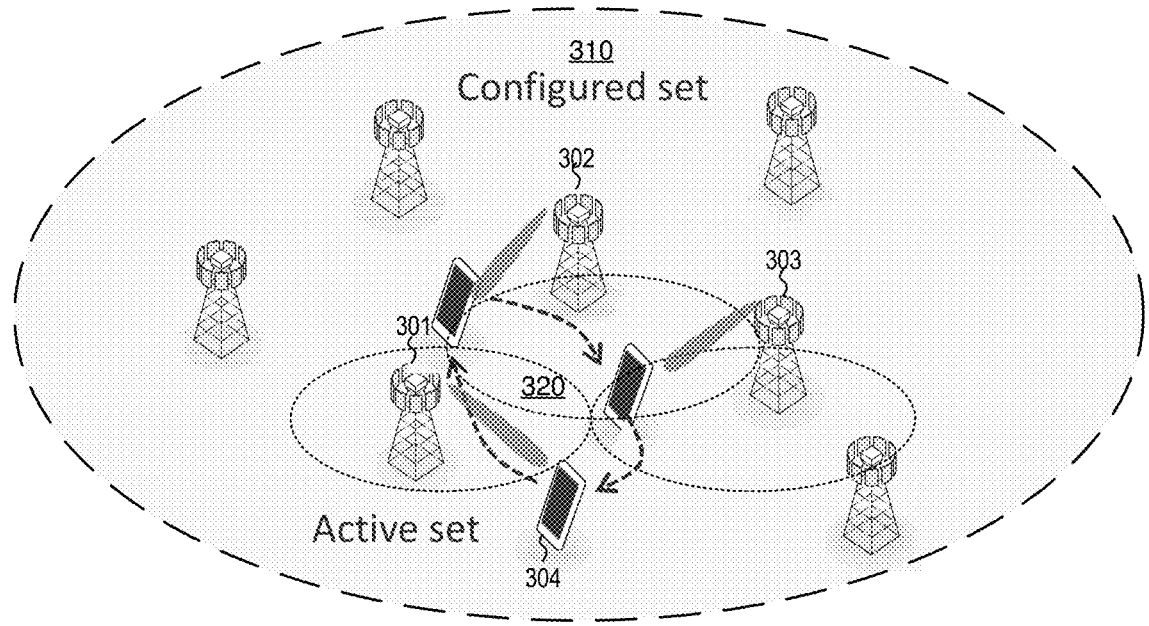
FIG. 3 illustrates a plurality of base stations with a configured set of cells and an active set of cells to reduce latency and interruption for inter-cell UE mobility.
Figure 3:
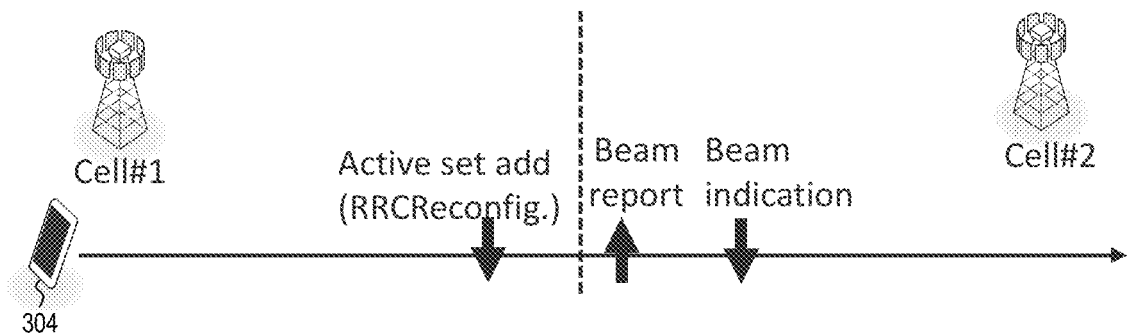

FIG. 3 illustrates a plurality of base stations with a configured set of cells 310 and an active set of cells 320 to reduce latency and interruption for inter-cell UE mobility. UE mobility can be L1, L2, or L3-based. In the example of FIG. 3, the active set 320 includes cells served by base stations gNB 301, gNB 302, and gNB 303. The remaining base stations belong to the configured set 310. UE 304 is originally served by cell #1 and receives RRC configuration on the set of active cells. The set of active cells is a set of cells among which the UE can do fast cell switching. The set of active cells for UE 304 is configured by the network based on UE measurement report or network deployment information. Cells in the active set keeps the UE context. UE 304 maintains the configuration and can perform pre-synchronization to the configured active cells in downlink (DL) only or in both DL and uplink (UL). UE 304 maintains the DL/UL synchronization with the active cells, and applies configuration of a target cell (from the active cells) once the UE is indicated to switch to the target cell, e.g., cell #2.

The set of active cells is a list of highly possible candidate target cells. The active set may change fast when UE moves, and thus proper active set management is desired. In one preferred embodiment, a two-step active set configuration is proposed. In a first step, the network provides configurations of (many) cells in a configured set, e.g., as depicted by configured set 310. In a second step, a subset of cells in the configured set is considered as active set, e.g., as depicted by active set 320. Cells can be activated/deactivated using MAC CE, based on measurement/beam report. For the configured set, cells that are prepared (i.e., possessing UE context), and UE processes and maintains the configurations for the cells. For the active set, UE can do fast switching among active cells. UE maintains DL/UL synchronization with active cells, and applies configurations once indicated to switch to an active cell. In one embodiment, the active set can be combined with an active transmission configuration indicator (TCI) state list. A cell with at least one associated TCI state in the list is an active cell. The active TCI state may refer to the TCI states activated by MAC-CE for control and/or data channel QCL assumption in DL and/or UL. UE performs fine time-frequency tracking for inter-cell reference signals associated with an active TCI state.

Figure 4:
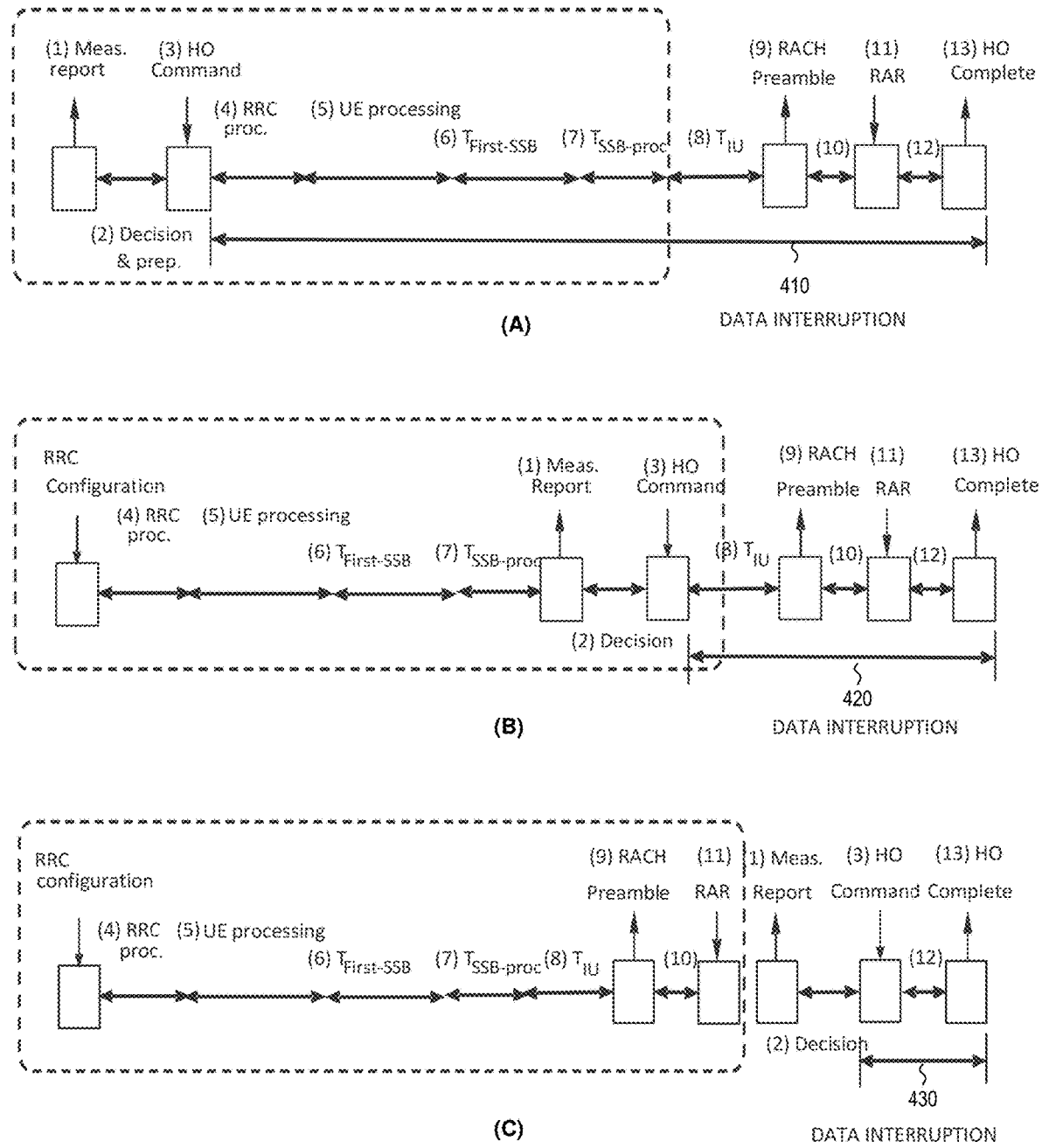
FIG. 4 illustrates different examples of a measurement and handover procedure in time domain with a set of active cell configuration in accordance with embodiments of the current invention.

FIG. 4 illustrates different examples of a measurement and handover procedure in time domain with a set of active cell configuration in accordance with embodiments of the current invention. FIG. 4(A) depicts the baseline measurement and handover procedure in time domain. In step (1), UE sends measurement report to the network. In step (2), decision and preparation for handover is made due to UE movement. In step (3) UE receives a handover command from the network. Steps (4) to (7) are the time period used for RRC processing, for UE processing, for obtaining the first SSB, and for SSB processing. In step (8), UE waits for random access occasion. In step (9), UE performs random access by sending out RACH preamble to the network. In step (10) and (11), UE waits for and receives random access response (RAR) from the network. In step (12), UE waits for UL grant for handover complete message. In step (13), UE sends the handover complete message, and the handover is completed. The overall data interruption time is from step (3) to step (13), as depicted by 410.

FIG. 4(B) depicts the measurement and handover procedure in time domain when a set of active cells are configured for UE. UE first receives RRC configuration for a list of active cells. UE then maintains configurations and DL timing for the list of active cells. As a result, the time tracking (e.g., steps (4) to (7)) can be performed by the UE earlier and thus eliminate corresponding interruption time. After the time tracking, in step (1), UE sends measurement report to the network. In step (2), decision and preparation for handover is made due to UE movement. In step (3), UE receives a handover command from the network. In step (8), UE waits for random access occasion. In step (9), UE performs random access by sending out RACH preamble to the network. In step (10) and (11), UE waits for receives random access response (RAR) from the network. In step (12), UE waits for UL grant for handover complete message. In step (13), UE sends the handover complete message, and the handover is completed. The overall data interruption time is from step (3) to step (13), as depicted by 420. It can be seen that the data interruption time is reduced because of the list of active cell configuration, which enables the UE to perform time tracking with the candidate target cells before receiving the handover command. The time for step (2) is also shortened since upon handover trigger, the configured active cells already process UE context. In addition, source data may continue until some point before RACH.

FIG. 4(C) depicts the measurement and handover procedure in time domain when a set of active cells are configured for UE supporting pre-RACH. UE first receives RRC configuration for a list of active cells. UE then maintains configurations and DL timing for the list of active cells. As a result, the time tracking (e.g., steps (4) to (7)) can be performed by the UE earlier and thus eliminate corresponding interruption time. In step (8), UE waits for random access occasion. In step (9), UE performs random access by sending out RACH preamble to the network. In step (10) and (11), UE waits for and receives random access response (RAR) from the network. After time tracking and RACH procedure, UE obtains both downlink and uplink synchronization for the candidate cell. Then in step (1), UE sends measurement report to the network. In step (2), decision and preparation for handover occurs due to UE movement. In step (3) UE receives a handover command from the network. In step (12), UE waits for UL grant for handover complete message. In step (13), UE sends the handover complete message, and the handover is completed. The overall data interruption time is from step (3) to step (13), as depicted by 430. It can be seen that the data interruption time is reduced because of the list of active cell configuration, which enables the UE to perform time tracking with the candidate target cells before receiving the handover command. The time for step (2) is also shortened since upon handover trigger, the configured active cells already process UE context. In addition, source data may continue until some point before RACH. In FIG. 4(C), for capable UEs, the RACH procedure is also done beforehand for the list of active cells, which further reduces the data interruption time for inter-cell handover.

Figure 5:
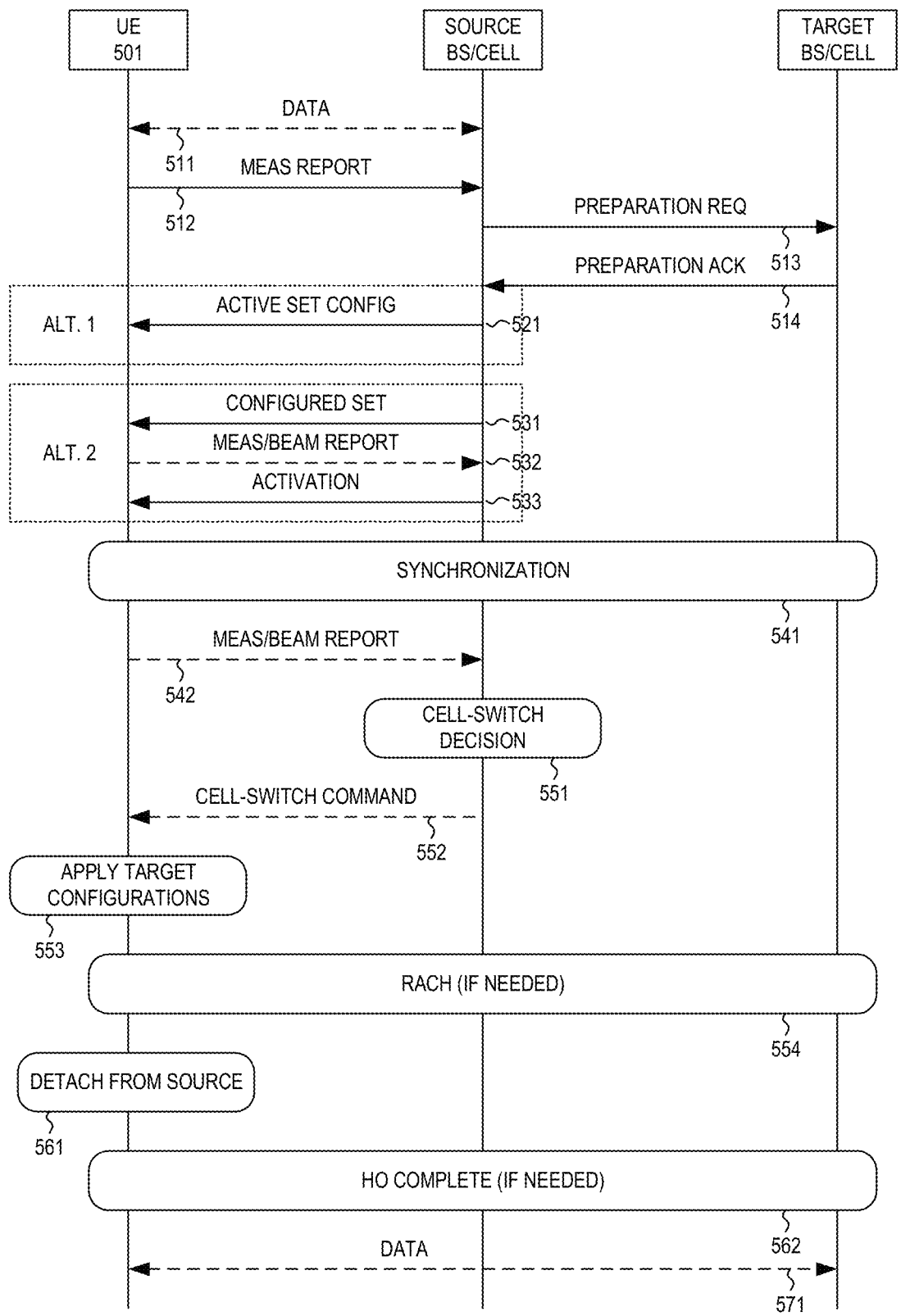
FIG. 5 is a message sequence flow between a UE, a source cell, and a target cell for UE mobility with reduced latency and interruption.

FIG. 5 is a message sequence flow between a UE, a source cell, and a target cell for UE mobility with reduced latency and interruption. In step 511, UE 501 transmits and receives data with a source base station in a source cell. In step 512, UE 501 sends measurement report of neighboring cells to the source gNB. In step 513, the source gNB makes handover decision and sends a preparation request to a target base station. In step 514, the target gNB sends a preparation acknowledgement back to the source gNB. The source gNB can then provide RRC configuration to UE 501 for a set of active cells. The RRC configurations comprise information for UE to perform synchronization and measurements on the active cells, and common and dedicated configurations required when the active cell becomes UEs' serving cell.

There are two alternative methods for active set configuration. In a first alternative of one-step configuration, the source gNB provides the active set directly via the RRC signaling message (step 521). The RRC message may add, modify, or remove a cell in active set. RRC message also tells UE whether active set should be kept after handover. In a second alternative of two-step configuration, the source gNB first provides the configured set via RRC signaling message (step 531), receives measurement or beam report from UE 501 (step 532, optional), and then provides activation signaling (e.g., via MAC CE command) to UE 501 for the active set (step 533). That is, RRC may configure a "configured set" and cells are activated or deactivated (added to or removed from active set) using MAC CE. In one example, if the number of cells in a configured set is smaller than a threshold value (e.g., 1 or 2), all the cells in the configured set are active cells. In another example, before activation signaling is received, certain specific cells in configured set are considered as active cells. For example, the 1$^{st}$ one.

After active set configuration and activation, in step 541, UE 501 performs synchronization for cells in the active set. In the downlink, UE 501 performs fine time-frequency tracking for at least some beams of the active cells. In the uplink, UE 501 performs pre-RACH for timing advance (optional). In step 542, UE 501 sends measurement or beam report to the source gNB. In step 551, the source gNB makes cell-switch decision. In step 552, the source gNB sends a cell-switch command to UE 501. Upon receiving the cell switching command, in step 553, UE 501 applies target cell configuration. The cell switching command can be L1/L2/L3 signal. In step 561, UE 501 detaches from the source cell, but UE 501 may keep the configurations of the source cell. In step 562, the handover procedure is completed. In step 571, UE 501 starts data transmission and reception in the target cell.

Figure 6:
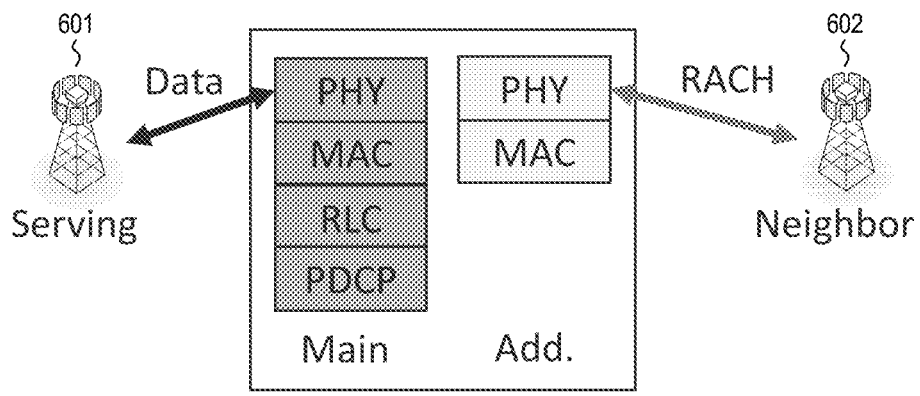
FIG. 6 illustrates one embodiment of performing pre-RACH for active cells with additional MAC/PHY in one novel aspect.

FIG. 6 illustrates one embodiment of performing pre-RACH for active cells with additional MAC/PHY in one novel aspect. UE may optionally perform pre-RACH for configured cells in the active set. In one example, UE may operate TDM (i.e., temporally detach from source cell to send preamble to and receive RAR from another cell), but RAR monitoring means interruption. In another example, RAR may be sent from the source gNB 601, i.e., UE needs not to wait for uncertain RAR from the target. In another example, UE may use additional MAC/PHY for RACH towards another cell, e.g., to neighbor gNB 602. Whether UE should perform pre-RACH for active cells may depend on UE capability. Network may indicate scheduling gaps for the pre-RACH. Network may indicate "RACH-less" if source TA can be reused, or if target TA=0.

Figure 7:
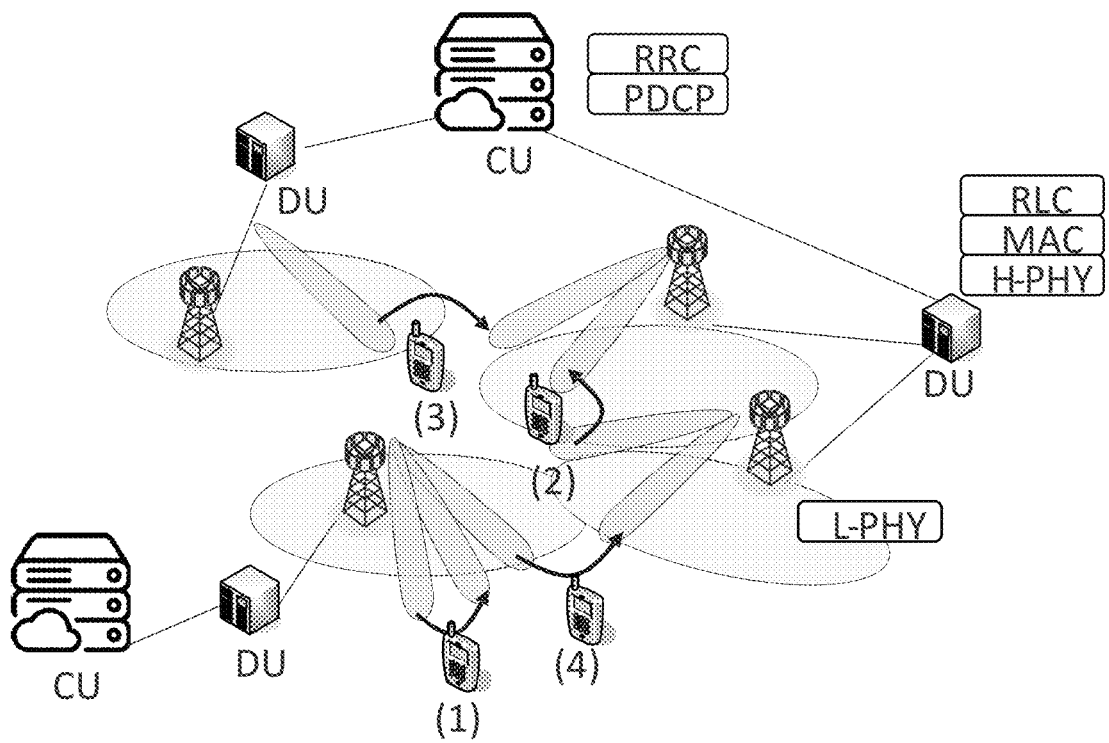
FIG. 7 illustrates UE behavior for different levels of UE mobility upon receiving cell switching command.

FIG. 7 illustrates UE behavior for different levels of UE mobility upon receiving cell switching command. There are different types of base stations and network units in the network infrastructure: a radio unit (RU) having PHY layer, a distributed unit (DU) having PHY, MAC, and RLC layers, a centralized unit (CU) having RRC and PDCP layers, and the 5GC core network. After receiving configurations for active cells, UE first processes the MAC/PHY configurations and then maintain the MAC/PHY configurations. Once a target cell is chosen from the list of active cells by receiving a cell switching command, the MAC/PHY configurations can be applied quite fast. The L2/L3 reconfigurations and re-establishment and key change may not be required for intra-DU case, but may be needed for inter-DU case, as explicitly indicated by the network. The interruption can be eliminated with additional protocol stack. UE is unaware of CU-DU split; the need of L2/3 reconfiguration/re-establishment and key change is indicated explicitly by network. If UE is pre-synchronized to a target cell, upon receiving cell switching command, UE does not perform RACH (again). UE may send HO complete (RRC message) in a pre-configured resource. Alternatively, if cell switching command indicates target TCI state, UE can receive PDCCH using target TCI state after a given interval (i.e., similar to intra-cell beam switching). During that interval, UE may keep communication with source cell, or simply be interrupted.

As depicted in FIG. 7, with CU-DU-RU split, mobility can happen at different levels. A first example of (1) depicts intra-RU, or inter-RU, intra-DU (intra-cell) mobility, where the UE performs a legacy L1/L2 mobility (beam management). A second example (2) depicts inter-RU, intra-DU (inter-cell) mobility, where the UE may perform L1/L2-centric inter-cell mobility and MAC reset. A third example (3) depicts inter-DU, intra-CU mobility, where the UE performs RLC re-establishment and MAC reset. A fourth example (4) depicts inter-CU mobility, wherein the UE performs PDCP re-establishment, security key change, RLC re-establishment, and MAC reset.

Figure 8:
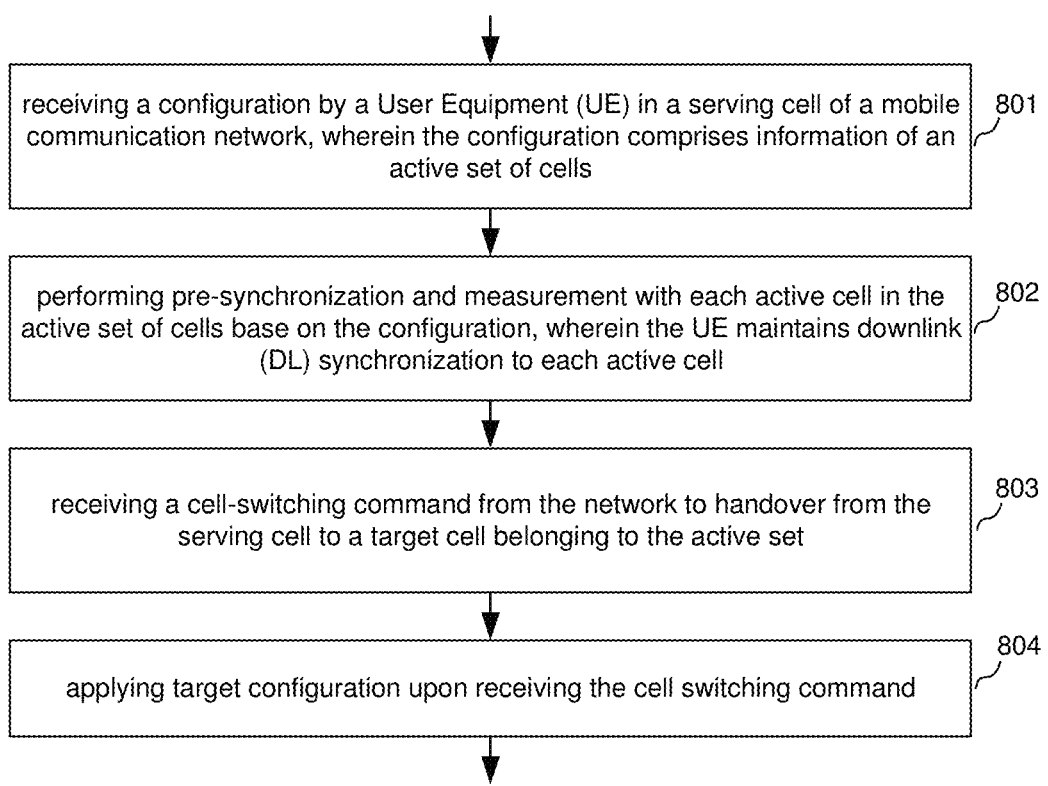
FIG. 8 illustrates a flow chart of a method for inter-cell mobility from the perspective of a UE in accordance with one novel aspect.

FIG. 8 illustrates a flow chart of a method for inter-cell mobility from the perspective of a UE in accordance with one novel aspect. In step 801, a UE receives a configuration in a serving cell of a mobile communication network, wherein the configuration comprises information of an active set of cells. In step 802, the UE performs pre-synchronization and measurement with each active cell in the active set base on the configuration, wherein the UE maintains downlink (DL) synchronization to each active cell. In step 803, the UE receives a cell-switching command from the network to handover from the serving cell to a target cell belonging to the active set. In step 804, the UE applies target configuration upon receiving the cell switching command.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a configuration by a User Equipment (UE) in a serving cell of a mobile communication network, wherein the configuration comprises information of an active set of cells;
   performing pre-synchronization and measurement with each active cell in the active set of cells base on the configuration, wherein the UE maintains downlink (DL) synchronization to each active cell, and wherein a cell is considered as belonging to the active set when at least one transmission configuration indicator (TCI)

state associated with the cell is in an active TCI state list, and wherein the UE performs fine time-frequency tracking for inter-cell reference signals associated with an active TCI state;

receiving a cell-switching command from the network to handover from the serving cell to a target cell belonging to the active set; and applying target configuration upon receiving the cell switching command.

2. The method of claim 1, wherein the active set is configured by a radio resource control (RRC) signaling, and the configuration further comprises common and dedicated configurations of the active set of cells.

3. The method of claim 1, wherein the UE is configured with a configured set of cells via a radio resource control (RRC) signaling, and wherein a subset of the configured set of cells is activated to become the active set of cells via a MAC control element.

4. The method of claim 1, wherein the UE maintains uplink synchronization for cells in the active set by performing a pre-random access channel (pre-RACH) procedure before receiving the cell-switching command.

5. The method of claim 4, wherein the UE is equipped with additional PHY and MAC layers for performing the pre-RACH towards the target cell.

6. The method of claim 1, wherein the UE obtains uplink synchronization by performing a random access channel (RACH) procedure with the target cell after receiving the cell-switching command.

7. The method of claim 1, wherein the UE performs radio link control (RLC) re-establishment and MAC reset for inter-distributed unit (inter-DU) mobility.

8. The method of claim 1, wherein the UE performs packet data convergence protocol (PDCP) layer re-establishment and security key change for inter-centralized unit (inter-CU) mobility.

9. A User Equipment (UE), comprising:
a receiver that receives a configuration in a serving cell of a mobile communication network, wherein the configuration comprises information of an active set of cells;
a synchronization circuit that performs pre-synchronization and measurement with each active cell in the active set of cells base on the configuration, wherein the UE maintains downlink (DL) synchronization to each active cell;
a handover circuit that receives a cell-switching command from the network to handover from the serving cell to a target cell belonging to the active set, and applies target configuration upon receiving the cell switching command, and wherein a cell is considered as belonging to the active set when at least one transmission configuration indicator (TCI) state associated with the cell is in an active TCI state list, and wherein the UE performs fine time-frequency tracking for inter-cell reference signals associated with an active TCI state.

10. The UE of claim 9, wherein the active set is configured by a radio resource control (RRC) signaling, and the configuration further comprises common and dedicated configurations of the active set of cells.

11. The UE of claim 9, wherein the UE is configured with a configured set of cells via a radio resource control (RRC) signaling, and wherein a subset of the configured set of cells is activated to become the active set of cells via a MAC control element.

12. The UE of claim 9, wherein the UE maintains uplink synchronization for cells in the active set by performing a pre-random access channel (pre-RACH) procedure before receiving the cell-switching command.

13. The UE of claim 12, wherein the UE is equipped with additional PHY and MAC layers for performing the pre-RACH towards the target cell.

14. The UE of claim 9, wherein the UE obtains uplink synchronization by performing a random access channel (RACH) procedure with the target cell after receiving the cell-switching command.

15. The UE of claim 9, wherein the UE performs radio link control (RLC) re-establishment and MAC reset for inter-distributed unit (inter-DU) mobility.

16. The UE of claim 9, wherein the UE performs packet data convergence protocol (PDCP) layer re-establishment and security key change for inter-centralized unit (inter-CU) mobility.

* * * * *